3,180,745
REFRACTORY GRAIN
Ben Davies, Pittsburgh, Pa., assignor to Harbison-Walker Refractories Company, Pittsburgh, Pa., a corporation of Pennsylvania
No Drawing. Filed Nov. 23, 1962, Ser. No. 239,793
6 Claims. (Cl. 106—59)

This invention relates to the fabrication of refractory grain which is usable for the manufacture of fired refractory shapes. More particularly, the invention relates to improved procedures of manufacturing pre-reacted, sintered, refractory aggregate grain of the type disclosed in co-pending United States patent application, Serial No. 783,596, owned by a common assignee. Thus, the invention has special utility in the fabrication of both chrome ore magnesia and magnesia-chrome ore refractory grain which, for simplicity in the following discussion, are sometimes generically referred to as "magnesite-chrome" refractory materials.

As discussed in the co-pending application, magnesite-chrome refractories are well known, and have been used primarily in metallurgical processes characterized by basic slags, or having atmospheres high in iron fumes or dusts. The earliest use of basic refractories of this type was confined largely to cooler furnace parts, since they did not exhibit sufficient strength at normal furnace operating temperatures to withstand the heavy stresses encountered in walls and roofs. More contemporary work has improved upon high temperature strength characteristics in such materials by a series of technical advances, so that magnesite-chrome refractory shapes are now usable, not only for construction of cooler furnace parts, but also for the fabrication of walls and roof spans.

However, despite the dramatic technical advances of workers in this area, magnesite-chrome refractories are still characterized by progressive weakening under operating conditions, which adversely affects the life of a furnace structure in which they are used. The invention of the co-pending application, above identified, provides a departure from prior processes of fabricating magnesite-chrome refractories; and furnishes improved magnesite-chrome refractory aggregate grain—which is used in making refractory shapes exhibiting excellent strength characteristics under high operating temperatures.

It is a primary object of this invention to provide improved procedures for manufacturing pre-reacted, sintered, magnesite-chrome refractory aggregate grain, which may be used to fabricate magnesite-chrome refractory shapes. Another object of the invention is to provide procedures for fabricating refractory grain from mixtures of high purity chrome ore and high purity magnesia. It is yet another object of the invention to provide improved refractory aggregate grain of the magnesite-chrome type, suitable for use in making refractory shapes having excellent strength characteristics under high operating temperatures. It is yet another object of the invention to provide an easily practiced, more economical method of making high purity magnesite-chrome grain.

Briefly, according to one aspect of this invention, there is taught a method of utilizing low silica chrome ores and high purity magnesium hydroxide to obtain refractory aggregate grain of improved refractoriness. In the grain recovered from this process, chrome ore and magnesia appear as a heterogeneous solid solution of mixed particles and crystals, preferentially attached to each other through the phenomena of solid-state diffusion. One usable chrome ore is one which has less than about 3%, by weight, of $SiO_2$, on the basis of an oxide analysis.

In one embodiment, the process includes the sequential manipulative steps of mixing, very carefully size graded, low silica chrome ore and extremely finely divided magnesium hydroxide; and, subsequently, subjecting this mixture to a roasting treatment at about 1800° F. The roasted mixture is subsequently fed to briquetting apparatus. The resulting briquettes are subjected to a dead burning treatment at a temperature in the range between about 3100 and 3500° F., which brings about a mineralogical union between the discrete particles of chrome ore and magnesia.

The following detailed description of the practice of this invention is given by way of example and not by way of limitation. The size gradings set forth, unless otherwise specifically mentioned, are according to the Tyler series. All parts and percentages are by weight. Unless otherwise stated, the chemical analyses of materials set forth are according to an oxide analysis, in conformity with conventional practices of reporting the chemical analysis of refractory materials. Also, the analyses set forth should be considered but typical.

For chrome ore and magnesia to be firmly attached to each other, a very high burning temperature is a necessary requirement in the manufacturing process. The high temperature is required to induce the RO phase in the chrome ore to diffuse outwardly from the chrome ore grains, and into adjacent magnesia grains. Concomitant with this RO diffusion from the chrome ore, magnesia counter-diffuses into the chrome ore to maintain the more stable $RO \cdot R_2O_3$ balance.

The high temperature treatment may be executed during dead burning of the raw materials, or it can be practiced after the raw materials are formed into a desired shape. The former technique is more attractive, since it is possible to work with high temperatures without concern over deformation and many other problems which are frequently experienced in burning shapes. According to this invention, the required high temperature burning is carried out on the raw materials, in order to produce a dead burned grain which is subsequently used for the manufacture of refractory shapes.

There are four basic manipulative operations in the practice of the invention. These steps include:

(1) Mixing of the raw material batch components,
(2) Roasting of the components to remove all free water and substantially all chemically combined water from the components,
(3) Compacting or briquetting the roasted raw material to provide a suitable feed for subsequent dead burning in a shaft kiln, and
(4) Actual dead burning of the briquettes to provide a material which may be subsequently crushed for use in the fabrication of refractory shapes.

*Mixing step*

According to the preferred practice of this invention, very carefully size graded, low silica, Philippine chrome ore concentrate is size graded to provide a raw material whic his essentially −10 +65 mesh. A workable range is −3 +100 mesh. The size graded chrome ore is intimately admixed with a magnesium hydroxide slurry. This step may be carried out by batch mixing the chrome ore with a magnesium hydroxide slurry, in the proportions 20 to 60 parts chrome ore and 80 to 40 parts MgO. For optimum results, the particles of magnesium hydroxide are substantially all 20 microns and less.

A suitable source for the magnesium hydroxide used for this invention is that recovered by the well known processes of reacting caustic dolomite with sea water, bitterns, or brines. The analysis of a suitable magnesium hydroxide (excluding free water and water of hydration) is about 98 parts MgO, the remainder, by difference, $SiO_2$, $Al_2O_3$, and CaO. A suitable chrome ore has the following typical oxide analysis: $Al_2O_3$ about 30%; $Cr_2O_3$ about 33%; MgO about 20%; CaO about 1%; FeO about 13%; $SiO_2$ about 2%; the remainder, by difference, ignition loss and trace impurities.

The intimately admixed slurry of carefully size graded chrome ore and magnesium hydroxide is then subjected to the roasting step.

Roasting step

The roasting step is important, in that the duration of treatment and the temperature to which the material is subjected must be sufficient to remove all free and substantially all chemically combined water from the batch ingredients. Preferably, the roasting step is carried out in a Herreshoff furnace, in which it is subjected to a temperature of at least about 1800° F. This temperature removes all free water and substantially all chemically combined water, and converts the magnesium hydroxide to magnesia in a highly reactive, caustic form. The magnesia particles appear to dust over the exterior surfaces of the chrome ore, to provide intimate association between the chrome ore and magnesia.

The roasting temperature should not exceed about 2400° F. Above this temperature, the magnesia tends to be transformed to a less reactive state (periclase). A workable range for the roasting treatment is between about 1500° F. and 2000° F.

Compacting

The intimately associated, highly reactive magnesia, and the chrome ore are subjected to a compaction treatment, in such as the well known Komarek-Greaves briquetting machine. This machine produces small almond-shaped briquettes, measuring on the order of 1.5 x ¾ x ⅝". We have found superior compacts are obtained when the roasted chrome ore and reactive magnesia mixture is briquetted while still warm, i.e. on the order of about 600° F. However, very satisfactory results were obtained when this mixture was cooled to room temperature, and then briquetted. However, it is important that this mixture be compacted very shortly after cooling, in order to prevent the highly reactive caustic magnesia from absorbing atmospheric moisture.

It is preferred that the briquettes be formed under a pressure of between about 10,000 and 20,000 p.s.i. Higher pressures, i.e. up to 40,000 p.s.i. and higher are usable, but this increased pressure only negligibly improved the quality of the product. Also, we have obtained satisfactory product using briquetting pressures as low as 5000 p.s.i. Superior compacts are obtained when a quantity of previously formed compacts are recirculated and intermixed with the feed to the briquette rolls. Preferably, this recirculating load may amount to between 10 and 50% of the feed to the rolls.

Dead burning

The briquettes or shaped compacts, with or without a temperature curing treatment, and either hot or cold, are charged to a vertical shaft kiln of the type operated on countercurrent heat recuperative principles; and in which the firing chamber or zone is formed by a series of burners placed circumferential of the kiln, intermediate its ends. The briquettes are charged through the top of such a kiln, and they move downwardly, under gravity effect, to discharge through the bottom. This type of kiln is well known in the art, and more detailed explanation would appear to complicate, rather than simplify, explanation of this invention.

An essential feature of the dead burning step is that the briquettes are heated to a temperature which is carefully maintained between 3100 and 3500° F. The temperature must be above about 3100° F., in order to induce the desired chemical union between the discrete particles of chrome ore and magnesia, which results from the diffusion and counter-diffusion of the RO phase of the chrome ore and MgO. The temperature should not exceed about 3500° F. (which is about the incipient fusion temperature of the chrome ore), or sticking and agglomeration in the kiln charge results.

While I have stated there is a chemical union between the chrome ore and magnesia, I am really not sure of the precise phenomena which occur. Under the microscope, one can see the firm attachment between the chrome ore and magnesia particles; and by X-ray diffraction techniques is able to detect microcrystalline change in the character of the chrome ore.

The dead burned briquettes recovered from the foregoing treatment are subsequently crushed, to provide refractory aggregate grain that may be mixed with material selected from the group magnesia and chrome ore, to provide refractory shapes which can be fired at relatively low temperatures, to obtain a strong ceramic bond.

Having thus described my invention in detail and with sufficient particularity as to enable those skilled in the art to practice it, what I desire to have protected by Letters Patent is set forth in the following claims.

I claim:

1. That method of manufacturing refractory grain which comprises the steps of, intimately admixing relatively coarse —3 +100 mesh low silica chrome ore and magnesium hydroxide, said magnesium hydroxide substantially all being smaller than 20 microns and being present in a quantity sufficient to supply 80 to 40 parts, by weight of an oxide basis, of MgO, subjecting the mixture to a roasting treatment at a temperature of no less than about 1500° F. and no more than about 2400° F. to remove all free and substantially all chemically combined water without converting the magnesia to its dead burned inactive form, feeding the roasted mixture to briquetting apparatus and forming briquettes, then, subjecting the briquettes to a dead buring treatment at a temperature in the range of from about 3100 to 3500° F. for a time period sufficient to cause an outward diffusion of the RO phase of the relatively coarse chrome ore and a counter diffusion of MgO to recover refractory grain which is microscopically characterized as a heterogeneous mixture of spinel particles and periclase crystals firmly attached to each other.

2. That method of manufacturing refractory grain which comprises the steps of, intimately admixing relatively coarse —3 +100 mesh low silica chrome ore and magnesium hydroxide in an aqueous suspension, said magnesium hydroxide substantially all being smaller than 20 microns and being present in a quantity sufficient to supply 80 to 400 parts, by weight on an oxide basis, of MgO, subjecting the mixture to a roasting treatment at a temperature of no less than about 1500° F. and no more than about 2400° F. to remove all free and substantially all chemically combined water without converting the magnesia to its dead burned inactive form, feeding the roasted mixture to briquetting apparatus and forming briquettes, then, subjecting the briquettes to a dead burning treatment at a temperature in the range of from about 3100 to 3500° F. for a time period sufficient to cause an outward diffusion of the RO phase of the relatively coarse chrome ore and a counter diffusion of MgO to recover refractory grain which is microscopically characterized as a heterogeneous mixture of spinel particles and periclase crystals firmly attached to each other.

3. The method of claim 1 in which the chrome ore is substantially all −10 +65 mesh.

4. The method of claim 1 in which the chrome ore has less than about 3%, by weight, of $SiO_2$, on the basis of an oxide analysis.

5. The method of claim 1 in which the roasted mixture is briquetted while still warm.

6. The method of claim 1 in which about 10 to 50%, by weight, of the feed to the briquetting step is previously formed briquette material.

References Cited by the Examiner
UNITED STATES PATENTS
2,571,134  10/51  Hicks et al. _____ 106—59

TOBIAS E. LEVOW, *Primary Examiner*.

UNITED STATES PATENT OFFICE
CERTIFICATE OF CORRECTION

Patent No. 3,180,745                                        April 27, 1965

Ben Davies

It is hereby certified that error appears in the above numbered patent requiring correction and that the said Letters Patent should read as corrected below.

Column 1, line 15, for "783,596" read -- 183,596 --; column 2, lines 27 and 28, for "necestary" read -- necessary --; line 64, for "whic his" read -- which is --; column 4, line 42, for "of", first occurrence, read -- on --; line 63, for "80 to 400" read -- 80 to 40 --.

Signed and sealed this 28th day of September 1965.

(SEAL)
Attest:

ERNEST W. SWIDER
Attesting Officer

EDWARD J. BRENNER
Commissioner of Patents